Patented Nov. 14, 1922.

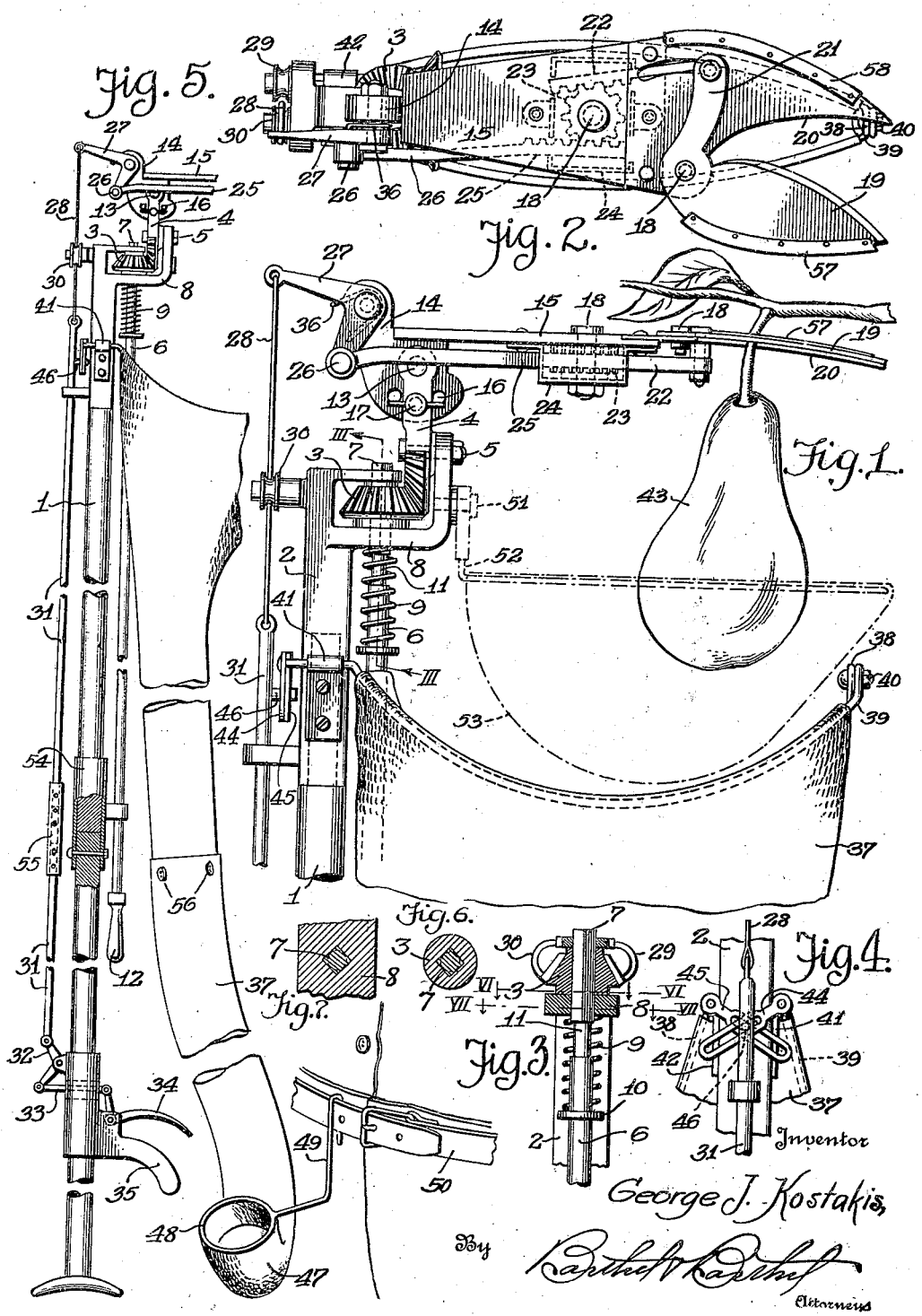

1,435,534

UNITED STATES PATENT OFFICE.

GEORGE J. KOSTAKIS, OF DETROIT, MICHIGAN.

FRUIT PICKER.

Application filed May 23, 1921. Serial No. 472,020.

*To all whom it may concern:*

Be it known that I, GEORGE J. KOSTAKIS, a subject of Greece, residing at Detroit, in the county of Wayne and State of Michigan, have invented certain new and useful Improvements in Fruit Pickers, of which the following is a specification, reference being had therein to the accompanying drawings.

This invention relates to a device for picking fruit and has for its principal object the provision of a simple severing mechanism by means of which the stems of various fruits may be cut and the fruit delivered to the operator, without injury.

A further object of the invention is to provide simple adjusting means whereby the shear-like blades may be tilted both laterally and longitudinally so that fruit in almost any position may be reached with ease.

A further object of the invention is to provide a framework for the upper end of the conveyor tube which normally will be narrow enough to pass readily between twigs or branches into position beneath the fruit, and which will be expanded to receive the fruit when the blades operate to sever the stems.

A still further object of the invention is to provide for the adjustment of the length of the pole, the conveyor and the pull rod.

With the above primary and other incidental objects in view, as will more fully appear in the specification, the invention consists of the features of construction, the parts and combinations thereof, and the mode of operation, or their equivalents as hereinafter described and set forth in the claims.

In the drawing,

Figure 1 is a side elevation of the upper end of the device illustrating the relation of the blades and of the mouth of the conveyor to the fruit;

Fig. 2 is a plan view of the parts illustrated in Fig. 1;

Fig. 3 is a detail sectional view taken on the line III—III of Fig. 1, of the means for adjusting the lateral tilting of the severing blades;

Fig. 4 is a detail of the operating means for the framework of the mouth of the conveyor;

Fig. 5 is an elevation of the entire device, parts being broken away and parts being in section;

Fig. 6 is a cross section on the line VI—VI of Fig. 3, and

Fig. 7 is a cross section on the line VII—VII of Fig. 3.

Secured to the end of a pole 1 is a supporting bracket 2 having its upper end formed to provide bearings for a bevel gear 3, and a pivoted supporting member 4 the lower end of which is formed as a segment of a bevel gear in mesh with the gear 3.

The supporting member 4 is mounted on a pivot 5 at right angles to the axis of the pole 1 so that rotation of the gear 3 causes the member 4 to move at an angle to the vertical. As a means for operating the bevel gear 3, there is provided a rod 6 having a non-circular end portion, preferably hexagonal, adapted to slide axially of the bevel gear 3, the bevel gear being non-rotatably mounted upon the portion 7. In the laterally projecting portion 8 of the bracket 2, is a non-circular opening of the same shape as that of the rod portion 7 and a spring 9 bearing against a collar 10 upon the rod 6 normally acts to hold the polygonal portion 7 within the opening in the bracket member 8. Beneath the portion 7, the rod has a cylindrical section 11 and when the rod 6 is pushed upwardly by means of the handle 12, the cylindrical portion 11 registers with the opening in the plate 8 permitting rotation of the rod 6 and corresponding rotation of the bevel gear 3. When the rod 6 is released, the spring 9 forces the portion 7 of the rod downward into the opening in the bracket member 8, thus locking the bevel gear 3 in its adjusted position.

In the upper portion of the supporting member 4, is a pivot 13 at right angles to the pivot 5 and upon this pivot is mounted the shank portion 14 of a shear-like severing tool 15. Spaced openings 16 engaged by a set screw 17 permit angular adjustment of the position of the shank 14 with respect to the supporting member 4.

Pivotally mounted at 18 upon an axis at right angles to the member 15, is a cutting blade 19 adapted to co-operate with the cutting edge 20 of the severing member 15.

The shank of the blade 19 is formed as a lever 21, pivotally secured to the rack member 22 in mesh with a gear 23 pivotally mounted in a housing 24 upon the member 15.

Upon the opposite side of the gear 23 is a rack member 25 pivoted at 26 to a bell crank lever 27 mounted upon the member 14. A flexible element 28 secured to the outer end of the bell crank lever 27 passes between the guide pulleys 29 and 30 and downward to the pull rod 31.

The lower end of the pull rod 31 is pivoted to a bell crank lever 32 near the lower end of the pole, and this lever 32 is connected by a link 33 to a hand lever 34 mounted upon a grip 35. A spring 36 about the pivot of the bell crank lever 27 acts to hold the blade 19 open except when operated by the hand lever 34.

A tubular conveyor 37, preferably made of canvas or other suitable fabric, has its upper end secured to a pair of members 38 and 39 pivoted together at their outer ends at 40 and having their inner ends pivoted in brackets 41 and 42 mounted upon the supporting bracket 2. The members 38 and 39 may conveniently be made of heavy wire curved between the pivot 40 and the brackets 41 and 42, so that when the curvatures are directed outwardly from each other, the mouth of the conveyor is held open to receive the fruit 43 severed from its twig by the cutting blades.

The ends of the members 38 and 39 adjacent to the brackets 41 and 42 are provided with oppositely extending cranks 44 and 45 which are adapted to be engaged by a projection 46 upon the pull rod 31, the arrangement being such that when the hand lever 34 is operated to pull the rod 31 to cause the cutting blade 19 to approach the cutting edge 20, the crank members 44 and 45 will be actuated by the projection 46 to swing the members 38 and 39 to open the mouth of the conveyor to its full size, but when the hand lever is released, the spring 36 will act to pull the rod 31 upward and the projection 46 will act to collapse the mouth of the conveyor by bringing the curved portions of the members 38 and 39 close together.

Thus normally the upper end of the conveyor is of no greater width than the width of the severing member 15, so that the device may be introduced through comparatively narrow spaces. When the blade 19 is brought against the stem of the fruit to be severed from its supporting twig, the mouth of the conveyor will be opened as the blade performs its cutting operation and the fruit will drop into the conveyor and slide to its pocketed lower end 47, which may conveniently have a hand opening surrounded by a wire loop 48 provided with a hook 49 to engage a belt 50 worn by the operator.

In certain cases, with delicate fruit, it may be desired to receive the fruit into a pouch instead of allowing it to slide down the conveyor. For this purpose, there is provided a pivot 51 from which may be hung a wire frame 52 carrying a pouch 53 carried above the mouth of the conveyor 37. When the pouch 53 is in position, the fruit will be received therein and the device must be lowered to permit the removal of the fruit. It will be observed that the conveyor may be left in position without interfering with the pouch 53.

In order to adapt the picker for use with trees of different heights the pole 1 will be made in sections which may conveniently be secured together by sleeves 54 such as those used for fishing poles so that as many sections may be used as are necessary.

The pull rod 31 will also be made in sections connected by sleeves 55. The rod 31 is adjustable in the sleeve 55 to provide for the difference in the position of the end of the bell crank lever 27 when the shank 14 is tilted upon the pivot 13.

It will be obvious that the conveyor 37 may also be made in sections secured together in any convenient way as for example by buttons 56.

To protect the bark of fruit trees from injury by contact with the outer edges of the cutting blades, cushioning strips 57 and 58 of rubber, leather or other suitable material are secured along the outer edges of the blade 19 and the body member 15.

From the above description, it will be apparent that there is thus provided a device of the character described possessing the particular features of advantage before enumerated as desirable, but which obviously is susceptible of modification in its form, proportion, details of construction and arrangement of parts without departure from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

I claim:

1. A fruit picker comprising a pole, a supporting bracket secured at the upper end thereof, a severing tool mounted upon the supporting bracket, a conveyor having a framework at its upper end comprising two curved elements mounted for pivotal movement upon the supporting bracket and means for moving the curved portions of the members toward and away from each other whereby to close and open the mouth of the conveyor tube.

2. A structure as in claim 1, having an operating device for the severing member adapted to open the mouth of the conveyor when the severing member is actuated.

3. A fruit picker having in combination means for severing fruit from its support, a conveyor the mouth of which is located adjacent to the severing means, and means to open the mouth of the conveyor.

4. A fruit picker comprising a severing member having a main portion provided with a cutting edge, a blade pivotally mounted upon the main portion to co-operate with the cutting edge, and an actuating means for the pivoted blade comprising a rack pivotally secured to the blade, a rack pivotally connected with a bell crank lever, a gear located between and in mesh with the two racks, and a pull rod secured to the bell crank lever whereby a pull upon the rod will bring the pivoted blade into operative relation with the cutting edge upon the main portion of the severing member and conveyor means beneath the pivoted blade adapted to be brought into operative position by said pull rod.

In testimony whereof I affix my signature in presence of two witnesses.

GEORGE J. KOSTAKIS.

Witnesses:
PETER KOSSIVA,
ARTHUR MINNICK.